US011958178B2

(12) United States Patent
Lübkert et al.

(10) Patent No.: US 11,958,178 B2
(45) Date of Patent: Apr. 16, 2024

(54) HANDLE AND HANDHELD POWER TOOL

(71) Applicant: HILTI AKTIENGESELLSCHAFT, Schaan (LI)

(72) Inventors: Ernst-Rudolf Lübkert, Landsberg am Lech (DE); Adrian Steingruber, Schwabmuenchen (DE)

(73) Assignee: Hilti Aktiengesellschaft, Schaan (LI)

( * ) Notice: Subject to any disclaimer, the term of this patent is extended or adjusted under 35 U.S.C. 154(b) by 146 days.

(21) Appl. No.: 17/254,121

(22) PCT Filed: Jul. 10, 2019

(86) PCT No.: PCT/EP2019/068562
§ 371 (c)(1),
(2) Date: Dec. 18, 2020

(87) PCT Pub. No.: WO2020/016078
PCT Pub. Date: Jan. 23, 2020

(65) Prior Publication Data

US 2021/0347030 A1 Nov. 11, 2021

(30) Foreign Application Priority Data

Jul. 17, 2018 (EP) .................................... 18183844

(51) Int. Cl.
*B25F 5/00* (2006.01)

(52) U.S. Cl.
CPC .................................... *B25F 5/006* (2013.01)

(58) Field of Classification Search
CPC .. B25F 5/006; B25F 5/02; B25F 5/024; B25F 5/026
See application file for complete search history.

(56) References Cited

U.S. PATENT DOCUMENTS

| | | | | |
|---|---|---|---|---|
| 4,783,038 | A | 11/1988 | Gilbert et al. | |
| 8,914,947 | B2 * | 12/2014 | Weiss | B25D 17/043 16/431 |
| 10,537,984 | B2 * | 1/2020 | Steingruber | B25F 5/006 |
| 2008/0148524 | A1 | 6/2008 | Wiker et al. | |
| 2009/0095497 | A1 | 4/2009 | Zimmermann et al. | |
| 2009/0283283 | A1 * | 11/2009 | Oesterle | B25F 5/006 173/162.2 |

FOREIGN PATENT DOCUMENTS

| | | | |
|---|---|---|---|
| CN | 101204806 | A | 6/2008 |
| CN | 102452070 | A | 5/2012 |
| DE | 373 7934 | A1 | 1/1998 |

(Continued)

OTHER PUBLICATIONS

International Search Report of PCT/EP2019/068562, dated Oct. 10, 2019.

*Primary Examiner* — Daniel Jeremy Leeds
(74) *Attorney, Agent, or Firm* — Davidson, Davidson & Kappel, LLC

(57) ABSTRACT

The handle for a handheld power tool includes a grip portion which can be gripped by a user, a fastening portion by which the handle can be fastened to the handheld power tool, and an oscillation decoupling device which is designed to decouple oscillations acting on the fastening portion from the grip portion, wherein the oscillation decoupling device has a spring element with a settable spring stiffness.

14 Claims, 3 Drawing Sheets

(56) References Cited

FOREIGN PATENT DOCUMENTS

| | | | |
|---|---|---|---|
| DE | 102007012300 | A1 | 4/2008 |
| DE | 102007060042 | A1 | 6/2009 |
| DE | 102007062714 | A1 | 7/2009 |
| EP | 0995553 | A2 | 4/2000 |
| GB | 2484811 | A | 4/2012 |
| JP | 2013067010 | A | 4/2013 |
| WO | WO 2009074449 | A1 | 6/2009 |
| WO | WO 2009083330 | A1 | 7/2009 |

* cited by examiner

HANDLE AND HANDHELD POWER TOOL

FIELD OF THE INVENTION

The present invention relates to a handle for a handheld power tool and to a handheld power tool having such a handle.

BACKGROUND

A handheld power tool, such as for example a drilling machine, can comprise a main handle, which is arranged to the rear of the handheld power tool, and a side handle, which is arranged on the front side of the handheld power tool. The side handle is generally releasably fastened to the handheld power tool. To prevent or at least reduce the transmission of oscillations or vibrations from the handheld power tool to the side handle, foams or elastomers can be used as springs. Such a spring is generally designed here for only one frequency to be isolated.

SUMMARY OF THE INVENTION

If, during the use of the handheld power tool, the frequency changes as a result of the application, the setting of the handheld power tool or the working frequency, these springs cannot be adapted to the different application cases. Consequently, these systems have only a single application area which is optimally tailored with respect to vibration isolation. If different frequencies occur in different application areas, the isolation system no longer functions optimally. The isolation performance decreases because the excitation frequency is no longer matched with the stiffness of the spring used. One and the same isolation system can thus often be used only in one type of handheld power tools and achieves its optimal performance only in a specific application area. Consequently, the potential for good vibration isolation is often not fully exploited.

An object of the present invention is to provide an improved handle for a handheld power tool.

Accordingly, the present invention provides a handle for a handheld power tool. The handle comprises a grip portion which can be gripped by a user, a fastening portion by means of which the handle can be fastened to the handheld power tool, and an oscillation decoupling device which is designed to decouple oscillations acting on the fastening portion from the grip portion, wherein the oscillation decoupling device has a spring element with a settable spring stiffness.

By virtue of the fact that the spring stiffness of the spring element is settable, the oscillation decoupling device can be used for a wide variety of application cases of a wide variety of handheld power tools. The field of use for the handle is significantly increased as a result. It is furthermore possible to dispense with the need to hold available different handles with a wide range of oscillation decoupling suitability.

What is to be understood by the "spring stiffness" in the present case is the ratio of a force acting on the spring element to the deflection of the spring element that is brought about by said force. The "deflection" can here be a compression or expansion of the spring element. The spring stiffness can also be referred to as spring constant, spring hardness or spring rate. What is to be understood by the fact that the oscillation decoupling device is designed to "decouple" the oscillations from the grip portion is that the oscillation decoupling device is designed to prevent or at least reduce the transmission of oscillations or vibrations from the fastening portion to the grip portion. In particular, the oscillation decoupling device is designed to reduce an oscillation amplitude. The handle is in particular a side handle of the handheld power tool or can be referred to as such.

According to one embodiment, the oscillation decoupling device is arranged at least in certain portions within a grip element of the handle.

The grip element is preferably tubular. The fact that the oscillation decoupling device is received in the grip element makes it possible to achieve a particularly compact design of the handle. Furthermore, the oscillation decoupling device is thus protected from damage. The grip element can be produced at least in certain portions from an elastically deformable material, such as for example an elastic plastics material, rubber or cork. This increases the operating comfort. During the operation of the handheld power tool, the grip element is gripped by the user.

According to a further embodiment, the spring element is produced from an elastomer, in particular from a rubber material, a thermoplastic elastomer or a silicone material.

The spring element can also be referred to as an elastomer spring element, elastomer spring or elastomer element. The spring element can be produced from any desired other elastically deformable material. The spring element can be produced from a foamed material. This means that the spring element can have pores. The material can be open-pored or closed-pored. The material can be a foam. Alternatively, the spring element can also be solid. The spring element can also comprise a metallic material. For example, the spring element can be a wire braid, an adjustable leaf spring or the like.

According to a further embodiment, the spring stiffness of the spring element is steplessly settable.

This means that the spring stiffness cannot only be adjusted in a graduated manner in few steps but can also be steplessly settable into a plurality of spring stiffnesses between a maximum possible spring stiffness and a minimum possible spring stiffness. The settability of the spring stiffness is reversible. This means that the spring stiffness of the spring element can be increased and then reduced again and accordingly also increased again.

According to a further embodiment, the spring element is tubular.

The spring element preferably has a hollow cylindrical geometry with an annular base surface.

According to a further embodiment, the oscillation decoupling device has a connecting element which is received in the spring element at least in certain portions and which connects the fastening portion to the grip portion.

The connecting element is preferably connected to the spring element in an integrally bonded manner. In the case of integrally bonded connections, the connection partners are held together by atomic or molecular forces. Integrally bonded connections are nonreleasable connections which can be disconnected only by destroying the connecting means and/or connection partners. An integrally bonded connection can involve adhesive bonding or vulcanization, for example. For example, the spring element is vulcanized onto the connecting element or adhesively bonded thereto. The connecting element can have a cylindrical base body which is received in the spring element. A threaded bolt can extend on the upper side out of the cylindrical base portion and is bolted to the fastening portion by means of a fastening element, for example a hexagon nut.

According to a further embodiment, the oscillation decoupling device has a spring element holder which is arranged within the grip portion and in which the spring element is received.

The spring element holder is preferably tubular or sleeve-shaped. The spring element holder is received in the grip element of the grip portion and fixedly connected thereto. For example, a toothing can be provided between the spring element holder and the grip element. Furthermore, the spring element holder can also be adhesively bonded to the grip element.

According to a further embodiment, the spring element connects the connecting element to the spring element holder, in particular in an integrally bonded manner.

For example, the spring element is adhesively bonded to or vulcanized onto the connecting element and the spring element holder. The spring element is thus arranged between the spring element holder and the connecting element, with the connecting element being arranged in particular in the spring element and the spring element being arranged in particular in the spring element holder. This affords a layered construction. A particularly compact design can be achieved as a result.

According to a further embodiment, the oscillation decoupling device has a setting element for setting the spring stiffness of the spring element.

To set the spring stiffness of the spring element, the spring element is linearly displaceable along a longitudinal direction of the spring element. The longitudinal direction can here correspond with an axis of symmetry of the grip portion or be oriented parallel thereto.

According to a further embodiment, the spring element has a receiving region which extends in a longitudinal direction of the spring element and in which the setting element is received at least in certain portions.

As mentioned above, to set the spring stiffness, the setting element can be displaced linearly in the receiving region. The further the setting element is pushed into the receiving region, the greater the spring stiffness, and the further the setting element is pulled out of the receiving region, the smaller the spring stiffness. The receiving region can be a bore extending along the longitudinal direction or an aperture extending along the longitudinal direction.

According to a further embodiment, the spring stiffness of the spring element can be increased by virtue of the fact that the setting element is displaced into the receiving region along the longitudinal direction, wherein the spring stiffness of the spring element can be reduced by virtue of the fact that the setting element is displaced out of the receiving region along the longitudinal direction.

As mentioned above, the displacement into and out of the receiving region can here occur steplessly, with the result that the spring stiffness of the spring element is steplessly settable.

According to a further embodiment, the handle comprises a plurality of receiving regions and a plurality of setting elements which are arranged so as to be distributed uniformly spaced apart from one another around a circumference of the spring element.

Alternatively, the receiving regions and the setting elements can also be arranged so as to be distributed nonuniformly spaced apart from one another around the circumference of the spring element. The setting elements and the receiving regions can all have an identical geometry or different geometries. Here, each receiving region is assigned a setting element, and vice versa.

According to a further embodiment, the setting element is bar-shaped and has a circular, oval or polygonal, in particular rectangular, triangular or square, cross section.

The geometry of the setting element is arbitrary. Each setting element can have an actuating region. The actuating region can be for example a folded end portion of the actuating element. The actuating region can for example be manually actuated.

According to a further embodiment, the spring stiffness of the spring element is set manually, mechanically or mechatronically.

This means that the user can manually adapt the spring stiffness of the spring element by displacing the setting elements. Furthermore, the setting elements can also be mechanically controlled in such a way that, when a predetermined oscillation amplitude is exceeded, the setting elements are mechanically displaced in order to adapt the spring stiffness. In the case of a mechatronic drive, it is possible on the basis of measured vibrations for an optimal spring stiffness of the spring element to be set by means of an adjusting element which displaces the setting elements. The setting elements are preferably bar-shaped and are produced from a material which allows the setting elements to be pulled out of and inserted into the spring element. Examples of setting elements which can be used are steel wires or shaped parts made of plastic.

The present invention also provides a handheld power tool having such a handle.

The handheld power tool can be for example a hammer drill, a chisel hammer, a core drill, a saw, a grinding machine, a screwdriver, a bolt driver or the like. The handheld power tool preferably has a housing with a main handle and the handle discussed above. The handle is preferably connected laterally to the housing. The handle can therefore also be referred to as a side handle. The handle is releasably connected to a cylindrical fastening portion of the housing. The handle can be pushed onto the fastening portion of the housing and then, by rotating the grip portion with respect to the fastening portion, be fixed on the latter. Conversely, the handle can also be released again from the handheld power tool by unclamping the fastening portion.

BRIEF DESCRIPTION OF THE FIGURES

The following description explains the invention on the basis of exemplary embodiments and figures. In the figures.

Identical or functionally identical elements are indicated in the figures by the same reference signs, unless specified otherwise.

DETAILED DESCRIPTION

Figure 1:
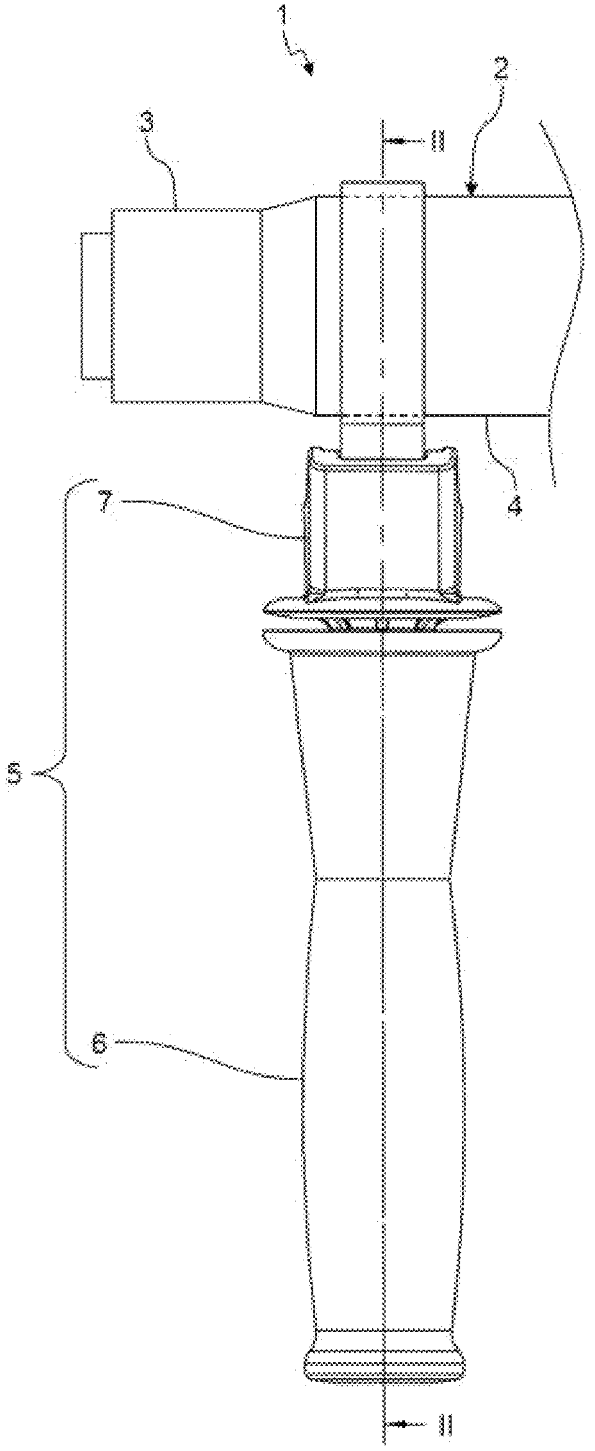
FIG. 1 shows a schematic view of one embodiment of a handheld power tool.

FIG. 1 shows a schematic view of one embodiment of a handheld power tool 1. The handheld power tool 1 can be for example a hammer drill, a chisel hammer, a core drill, a saw, a grinding machine, a screwdriver, a bolt driver or the like.

The handheld power tool 1 comprises a housing 2 to which for example a battery is fastened. Alternatively, a power cable which can be connected to a plug socket can also be provided on the housing 2. Furthermore, the housing 2 comprises a main handle (not shown) which is arranged to the right in the orientation of FIG. 1. A fastening device 3 for fastening a tool, in particular a cutting tool, such as for example a drill bit, is also provided on the handheld power tool 1. The fastening device 3 is arranged to the left in the orientation of FIG. 1. The fastening device 3 is for example a jaw chuck or drill chuck. The housing 2 comprises a fastening portion 4. The fastening portion 4 is preferably cylindrical, in particular circular cylindrical, in cross section.

A handle 5 is releasably fastened to the fastening portion 4. "Releasable" means here that the handle 5 can be disconnected from the fastening portion 4 and reconnected thereto. The handle 5 can also be rotatably mounted on the fastening portion 4. For example, the handle 5 can be pushed onto the fastening portion 4 from left to right in the orientation of FIG. 1 and be removed from the fastening portion 4 from right to left. The handle 5 is in particular a so-called side handle or can be referred to as a side handle. The handle 5 comprises a grip portion 6, which can be gripped by a user to operate the handheld power tool 1, and a preferably annular fastening portion 7, which can be releasably connected to the fastening portion 4 of the housing 2.

Figure 2:
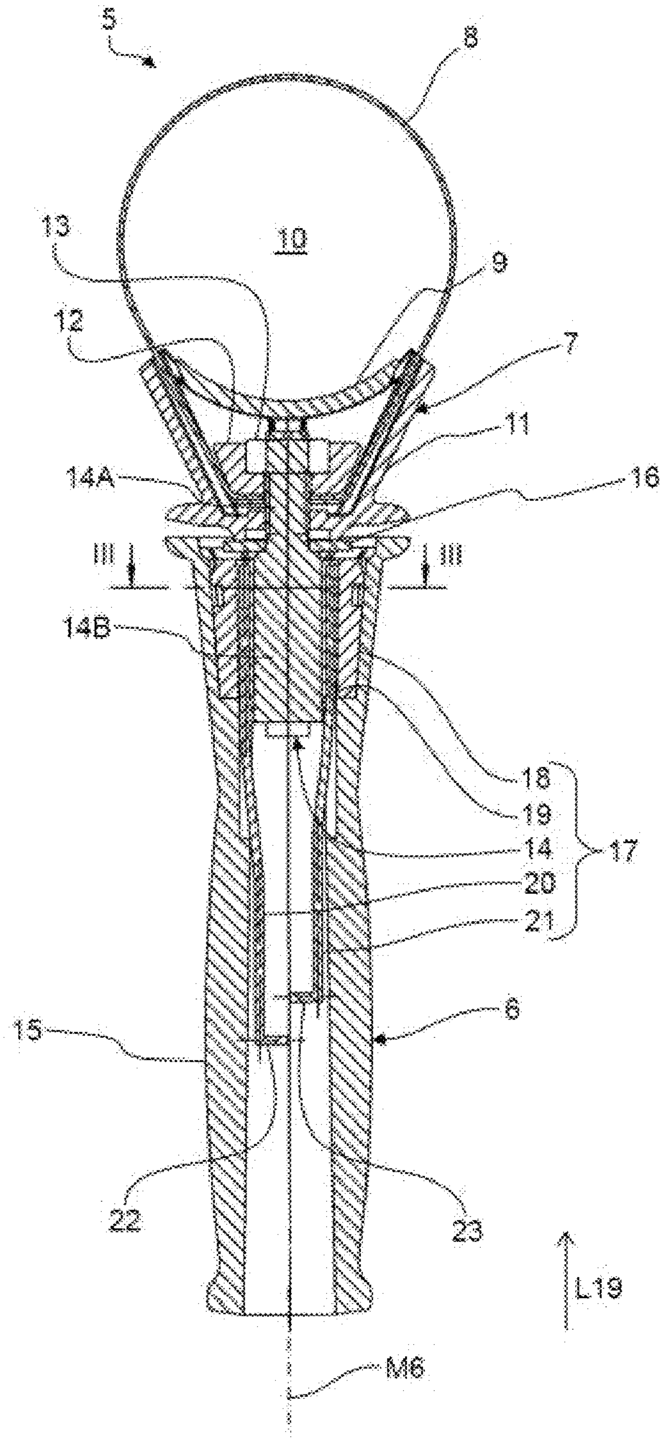
FIG. 2 shows a schematic side view of one embodiment of a handle for the handheld power tool taken along the section line II-II of FIG. 1.

As shown in FIG. 2, the fastening portion 7 comprises a clamping band 8. The clamping band 8 can be for example a steel band. Furthermore, the fastening portion 7 comprises a support element 9. The clamping band 8 and the support element 9 form a circular receiving region 10 for the fastening portion 4 of the housing 2 of the handheld power tool 1. Furthermore, the fastening portion 7 comprises a base element 11, a tensioning element 12 and a fastening element 13 received in the tensioning element 12. The fastening element 13 can be for example a hexagon nut. The support element 9, the tensioning element 12 and the fastening element 13 are received in the base element 11 at least in certain portions.

The fastening element 13 is screwed to a connecting element 14 assigned to the grip portion 6. For this purpose, the connecting element 14 has a threaded bolt 14A which is guided through the base element 11, the clamping band 8, the tensioning element 12 and the fastening element 13. Rotating the grip portion 6 with respect to the fastening portion 7 thus makes it possible for the fastening element 13 to be tightened to tension the clamping band 8 and to be loosened to release the clamping band 8. In this way, the fastening portion 7 can be releasably connected to the fastening portion 4 of the handheld power tool 1. The connecting element 14 further comprises a base body 14B from the end side of which the threaded bolt 14A extends.

The grip portion 6 comprises a grip element 15. The grip element 15 is preferably designed to be rotationally symmetrical to an axis of symmetry M6 of the grip portion 6. The grip element 15 can be produced from an elastically deformable material at least in certain portions. During operation of the handheld power tool 1, the grip element 15 is gripped at least in certain portions by a hand of the user. The grip element 15 can be tubular in design. The connecting element 14, in particular the base body 14B of the connecting element 14, is received in the grip element 15 at least in certain portions. A disk 16 can be arranged between the grip element 15 and the base element 11. The disk 16 is for example a washer.

An oscillation decoupling device 17 of the handle 5 is received in the grip element 15. The oscillation decoupling device 17 comprises a sleeve-shaped or tubular spring element holder 18 which is received in the grip element 15 and which faces the fastening portion 7. The spring element holder 18 can be for example a plastics component. The spring element holder 18 is connected to the grip element 15 in a rotationally fixed manner. The connecting element 14, likewise assigned to the oscillation decoupling device 17, in particular the base body 14B thereof, is received in the spring element holder 18.

The oscillation decoupling device 17 further comprises a spring element 19, whose spring stiffness is settable, and also a plurality of setting elements 20, 21 by means of which the spring stiffness of the spring element 19 can be set. The spring element 19 is assigned a longitudinal direction L19. The longitudinal direction L19 extends parallel to the axis of symmetry M6. The longitudinal direction L19 can correspond with the axis of symmetry M6. The longitudinal direction L19 can be oriented from bottom up or from top down in the orientation of FIG. 2. The setting elements 20, 21 can be formed for example as steel wires or plastics bodies. Each setting element 20, 21 is assigned an actuating region 22, 23. The actuating regions 22, 23 can be formed by virtue of the fact that the respective setting element 20, 21 is bent over or folded at the end side by 90°.

Figure 3:
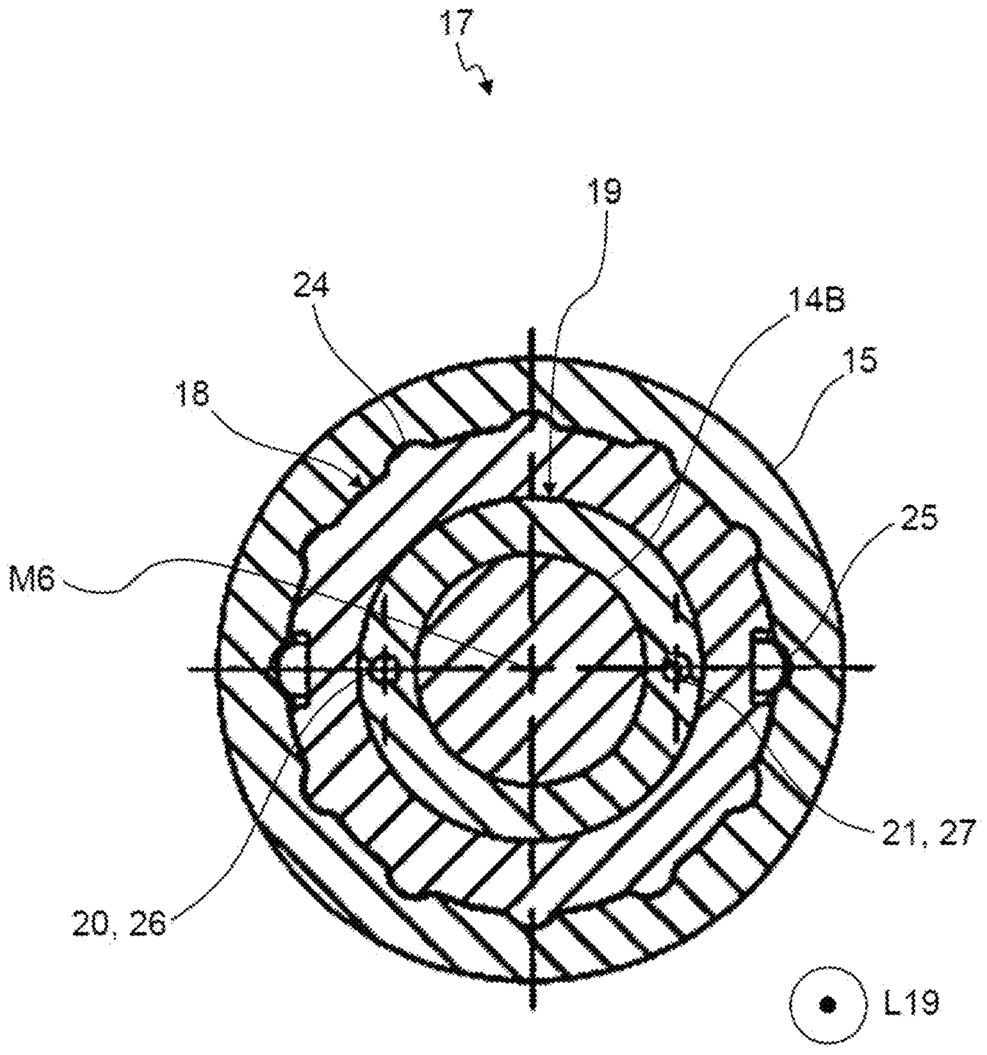
FIG. 3 shows an enlarged schematic sectional view of the handle taken along the section line III-III of FIG. 2.

FIG. 3 shows the oscillation decoupling device 17 in a sectional view taken along the section line III-III of FIG. 2. As shown in FIG. 3, the spring element holder 18 is connected to the grip element in a rotationally fixed manner by means of a toothing 24. In addition, a connection can also be provided by means of feather keys 25. Furthermore, the spring element holder 18 can also be adhesively bonded to the grip element 15. The sleeve-shaped or tubular spring element 19 is received in the spring element holder 18. The spring element 19 is produced from an elastomer, such as for example rubber, a thermoplastic polyurethane, a silicone material or the like.

The spring element 19 is an elastomer spring element or can be referred to as such. The spring element 19 has a hollow cylindrical geometry with an annular base surface. The geometry of the spring element 19 extends along the axis of symmetry M6 in the longitudinal direction L19. The spring element 19 is here designed to be rotationally symmetrical to the axis of symmetry M6. The spring element 19 can for example be adhesively bonded to or vulcanized onto the spring element holder 18. This means that the spring element 19 can be connected to the spring element holder 18 in an integrally bonded manner. In the case of integrally bonded connections, the connection partners are held together by atomic or molecular forces. Integrally bonded connections are nonreleasable connections which can be disconnected only by destroying the connecting means.

As is further shown in FIG. 3, the connecting element 14 or the base body 14B thereof is received in the spring element 19. The connecting element 14 can in turn be adhesively bonded to the spring element 19, or the latter can be vulcanized onto the connecting element 14. The spring element 19 comprises a plurality of receiving regions 26, 27 which extend in the longitudinal direction L19 and in which the setting elements 20, 21 are received. The receiving regions 26, 27 can take the form of bores extending in the longitudinal direction L19. Here, the receiving regions 26, 27 can breach the entire spring element 19 over its entire length. As shown in FIG. 3, the receiving regions 26, 27 can take the form of circular bores.

Alternatively, however, the receiving regions 26, 27 can have any other desired geometry. For example, the receiving regions 26, 27 can be designed to be polygonal, in particular triangular, square or rectangular. A plurality of such receiving regions 26, 27 are preferably provided which are arranged so as to be distributed uniformly around a circumference of the spring element 19. For example, ten such receiving regions 26, 27 and accordingly also ten such setting elements 20, 21 are provided. The spring stiffness of the spring element 19 can be adjusted by means of the setting elements 20, 21. What is to be understood by the spring stiffness in the present case is the ratio of a force acting on the spring element 19 to the deflection of the spring element 19 that is brought about by said force.

The spring stiffness, spring constant, spring hardness or spring rate of the spring element 19 is adjusted by virtue of the fact that the setting elements 20, 21 are pushed into or pulled out of the spring element 19. Pushing the setting elements 20, 21 into the spring element 19 increases its spring stiffness. Pulling the setting elements 20, 21 out of the spring element 19 reduces its spring stiffness. This process is reversible. The setting elements 20, 21 can here be moved synchronously or asynchronously.

The functionality of the oscillation decoupling device 17 is explained below. Vibrations of different frequencies can occur in different applications of the handheld power tool 1. It is desirable here that these vibrations or oscillations are not transmitted, or are transmitted only with damping, to the grip portion 6 of the handle 5 in order to improve the comfort for the user. By virtue of the fact that the oscillation decoupling device 17 can be controlled by means of the setting elements 20, 21, the spring stiffness of the spring element 19 can be varied such that the handheld power tool 1 can always operate in an optimal operating point and thus a minimum of oscillations or vibrations at the grip portion 6 can be achieved in all operating points. As a result, the handle 5 can be used for a wide variety of handheld power tools 1 in a wide variety of operating states.

The setting elements 20, 21 can here be manually actuated by the user. Furthermore, a mechanical adjustment and/or a mechatronic adjustment can also occur. In the case of a mechatronic adjustment it is possible to achieve the advantage that an optimal spring stiffness of the spring element 19 can be set on the basis of measured oscillations or vibrations. An adjusting element for displacing the setting elements 20, 21 can then be provided.

The setting elements 20, 21 are preferably produced from a material which allows the setting elements 20, 21 to be inserted into the spring element 19 and pulled out again therefrom in a simple manner and without the risk of kinking and at the same time to fill or free the receiving regions 26, 27 provided in the spring element 19. The setting elements 20, 21 can be for example steel wires or shaped parts made of plastic. The setting elements 20, 21 can here be round. However, the setting elements 20, 21 can also have any desired geometry. For example, the setting elements 20, 21 can have a polygonal or oval cross section.

REFERENCE SIGNS USED

1 handheld power tool
2 housing
3 fastening device
4 fastening portion
5 handle
6 grip portion
7 fastening portion
8 clamping band
9 support element
10 receiving region
11 base element
12 tensioning element
13 fastening element
14 connecting element
14A threaded bolt
14B base body
15 grip element
16 disk
17 oscillation decoupling device
18 spring element holder
19 spring element
20 setting element
21 setting element
22 actuating region
23 actuating region
24 toothing
25 feather key
26 receiving region
27 receiving region
L19 longitudinal direction
M6 axis of symmetry

What is claimed is:

1. A handle for a handheld power tool, the handle comprising: a grip portion grippable by a user; a fastener portion, the handle fastenable to the handheld power tool via the fastener portion; and an oscillation decoupling device designed to decouple oscillations acting on the fastening portion from the grip portion, the oscillation decoupling device having a spring element with a settable spring stiffness and having a plurality of setting elements for setting the spring stiffness of the spring element, the spring element having a plurality of receiving regions extending in a longitudinal direction of the spring element, the setting elements being received at least in certain portions in the receiving regions; the receiving regions and the setting elements being arranged so as to be distributed and spaced apart evenly from one another.

2. The handle as recited in claim 1 wherein the oscillation decoupling device is arranged at least in certain portions within a grip element of the handle.

3. The handle as recited in claim 1 wherein the spring element is produced from an elastomer.

4. The handle as recited in claim 3 wherein the elastomer is a rubber material, a thermoplastic elastomer or a silicone material.

5. The handle as recited in claim 1 wherein a spring stiffness of the spring element is steplessly settable.

6. The handle as recited in claim 1 wherein the spring element is tubular.

7. The handle as recited in claim 6 wherein the oscillation decoupling device has a connector element received in the spring element at least in certain portions and connecting the fastener portion to the grip portion.

8. The handle as recited in claim 7 wherein the oscillation decoupling device has a spring element holder arranged within the grip portion, the spring element being received in the spring element holder.

9. The handle as recited in claim 8 wherein the spring element connects the connector element to the spring element holder.

10. The handle as recited in claim 9 wherein the spring element integrally bonds the connector element to the spring element holder.

11. The handle as recited in claim 1 wherein the spring stiffness of the spring element is increasable when the setting elements are displaced into the receiving region along the longitudinal direction, and the spring stiffness of the spring element is reduceable when the setting elements are displaced out of the receiving regions along the longitudinal direction.

12. The handle as recited in claim 1 wherein setting elements are bar-shaped and have a circular cross section.

13. The handle as recited in claim 1 wherein the spring stiffness of the spring element is set manually.

14. A handheld power tool comprising the handle as recited in claim 1.

* * * * *